(12) United States Patent
Shih et al.

(10) Patent No.: US 8,004,834 B2
(45) Date of Patent: Aug. 23, 2011

(54) NOTEBOOK COMPUTER STAND

(75) Inventors: Po-Jen Shih, Taipei Hsien (TW); Ting-Han Lin, Taipei Hsien (TW); Shu-I Chen, Taipei Hsien (TW)

(73) Assignee: Gigabyte Technology, Taipei (TW)

( * ) Notice: Subject to any disclaimer, the term of this patent is extended or adjusted under 35 U.S.C. 154(b) by 0 days.

(21) Appl. No.: 12/645,456

(22) Filed: Dec. 22, 2009

(65) Prior Publication Data
US 2011/0149494 A1    Jun. 23, 2011

(51) Int. Cl.
*H05K 5/00* (2006.01)
*H05K 7/00* (2006.01)

(52) U.S. Cl. ......... 361/679.55; 361/679.08; 361/679.27; 361/679.56; 248/917; 248/918

(58) Field of Classification Search ............. 361/679.08, 361/679.27, 679.41, 679.44, 679.55, 679.56, 361/679.59; 248/127, 158, 174, 676, 917, 248/918
See application file for complete search history.

(56) References Cited

U.S. PATENT DOCUMENTS

| | | | | |
|---|---|---|---|---|
| 5,633,782 A | * | 5/1997 | Goodman et al. | 361/679.41 |
| 6,430,038 B1 | * | 8/2002 | Helot et al. | 361/679.05 |
| 2002/0171020 A1 | * | 11/2002 | Huang et al. | 248/346.01 |

* cited by examiner

*Primary Examiner* — Jayprakash N Gandhi
*Assistant Examiner* — Anthony M Haughton
(74) *Attorney, Agent, or Firm* — Ming Chun Chou (57) ABSTRACT

A notebook computer including a bottom case and a top panel is provided, wherein the top panel includes a first supporting element, a top panel body and a second supporting element. The first supporting element has a first side and a second side, wherein the first side pivots to the bottom case, and the top panel body pivots to the first side of the first supporting element. The top panel body has multiple sets of first fixing structure. The second supporting element has a third side and a fourth side, wherein the third side pivots to the second side of the first supporting element. The fourth side has a set of second fixing structures, which is inserted into one set of the first fixing structures.

2 Claims, 12 Drawing Sheets

NOTEBOOK COMPUTER STAND

BACKGROUND OF THE INVENTION

1. Field of the Invention

The disclosure relates to a notebook computer stand.

2. Description of Related Art

With the development of technique, notebook computers have different sizes for a user to choose. The present notebook computers have advantages of easy carrying and little space occupying when using. However, when a notebook computer is used by the user, the notebook is placed on a tabletop, and a screen of the notebook computer is much lower than a best visual angle for the user when using, thus the user is forced to operate the notebook computer in wrong gestures such as twisting his (or her) neck forward, bending his (or her) head, or hunching his (or her) back, etc. If the user operates the notebook with the harmful habits in long period, the user would be hurt.

SUMMARY OF THE INVENTION

The present invention provides a notebook computer stand, and users operate a notebook computer with the notebook computer stand in a comfortable gesture.

The present invention provides a notebook computer stand including a bottom case and a top panel. The top panel comprises a first supporting element, a top panel body and a second supporting element. The first supporting element has a first side and a second side, wherein the first side pivots to the bottom case, the top panel body pivots to the first side of the first supporting element, and the top panel body has a plurality of sets first fixing structures. The second supporting element has a third side and a fourth side, wherein the third side pivots to the second side of the first supporting element, and the fourth side has a set of second fixing structures inserted into one set of the first fixing structures.

In one embodiment of the notebook computer stand in the present invention, a first surface of the above mentioned bottom case facing the top panel body has a keyboard module.

In one embodiment of the notebook computer stand in the present invention, the above mentioned first fixing structures are concaves, and the second fixing structures are protrusions.

In one embodiment of the notebook computer stand in the present invention, the above mentioned bottom case has two sliding troughs, and the first side has two ends inserting into the sliding troughs correspondingly. In addition, a first surface of the bottom case relatively close to the top panel has a keyboard module, and a second surface opposite to the first surface has a concave.

In one embodiment of the notebook computer stand in the present invention, the above mentioned bottom case comprises a main body and a connecting element, wherein the connecting element has a fifth side and a sixth side, the fifth side pivots to the main body, and the first supporting element pivots to the sixth side. In addition, when the top panel body is closed relative to the main body, a first surface of the main body facing the top panel body has a keyboard module, and a second surface opposite to the first surface has a concave.

In one embodiment of the notebook computer stand in the present invention, the above mentioned top panel body has an opening, the first supporting element and the second supporting element have plate shapes, and the first supporting element and the second supporting element are located in the opening.

As mentioned above, the height of the notebook computer screen can be adjusted according to requirements by using the notebook computer stand of the present invention, thus the user can operate a notebook computer in a comfortable gesture.

It is to be understood that both the foregoing general descriptions and the following detailed embodiments are exemplary and are, together with the accompanying drawings, intended to provide further explanation of technical features and advantages of the disclosure.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 1:
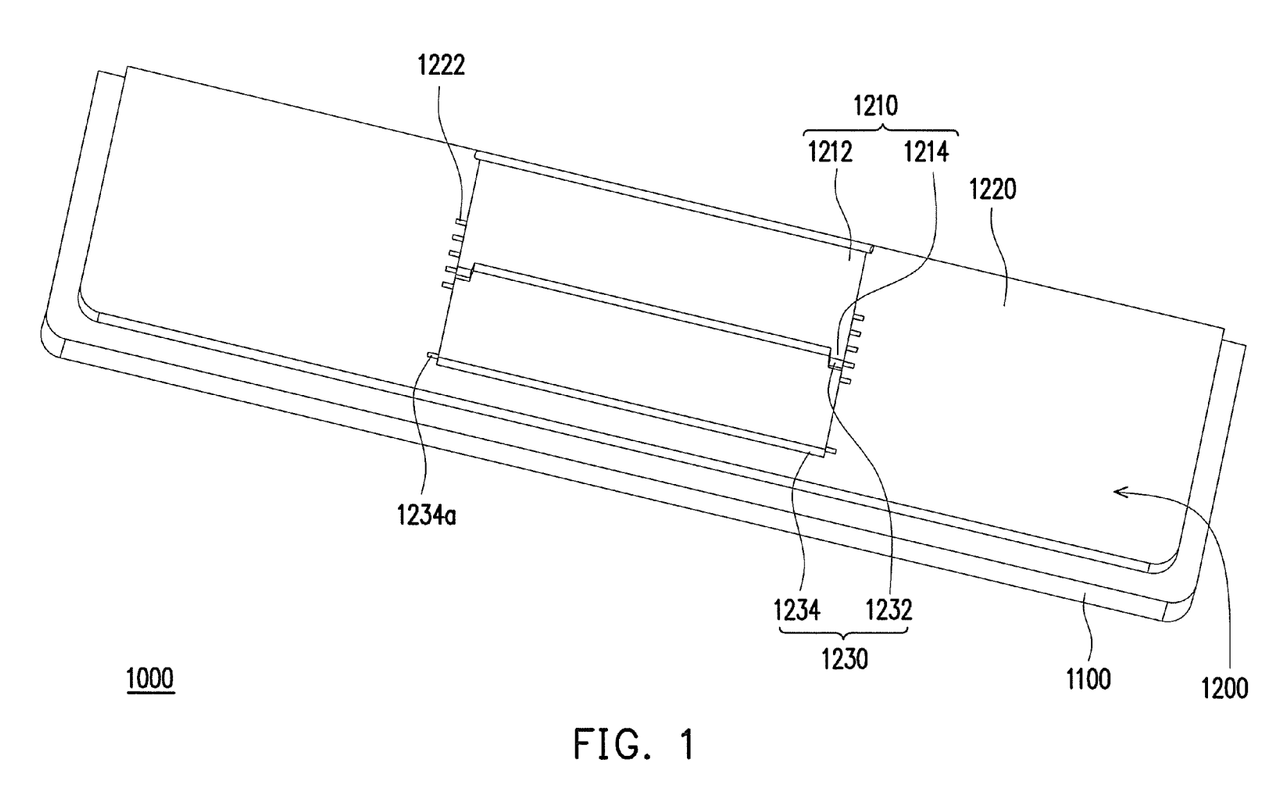
FIG. 1 is a perspective view of a notebook computer stand in the first embodiment of the present invention.
Figure 2:
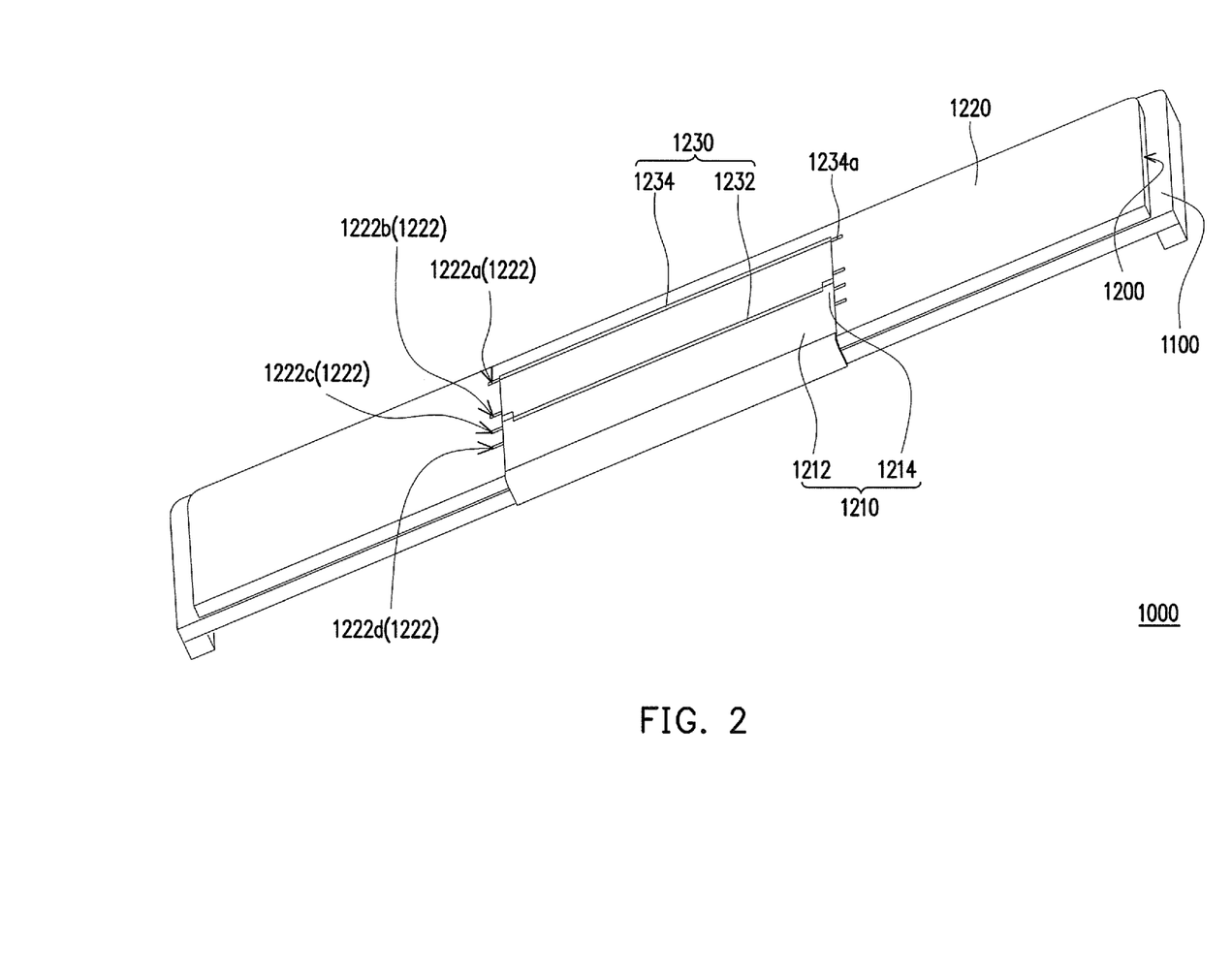
FIG. 2 is an another perspective view of the notebook computer stand in FIG.
Figure 3:
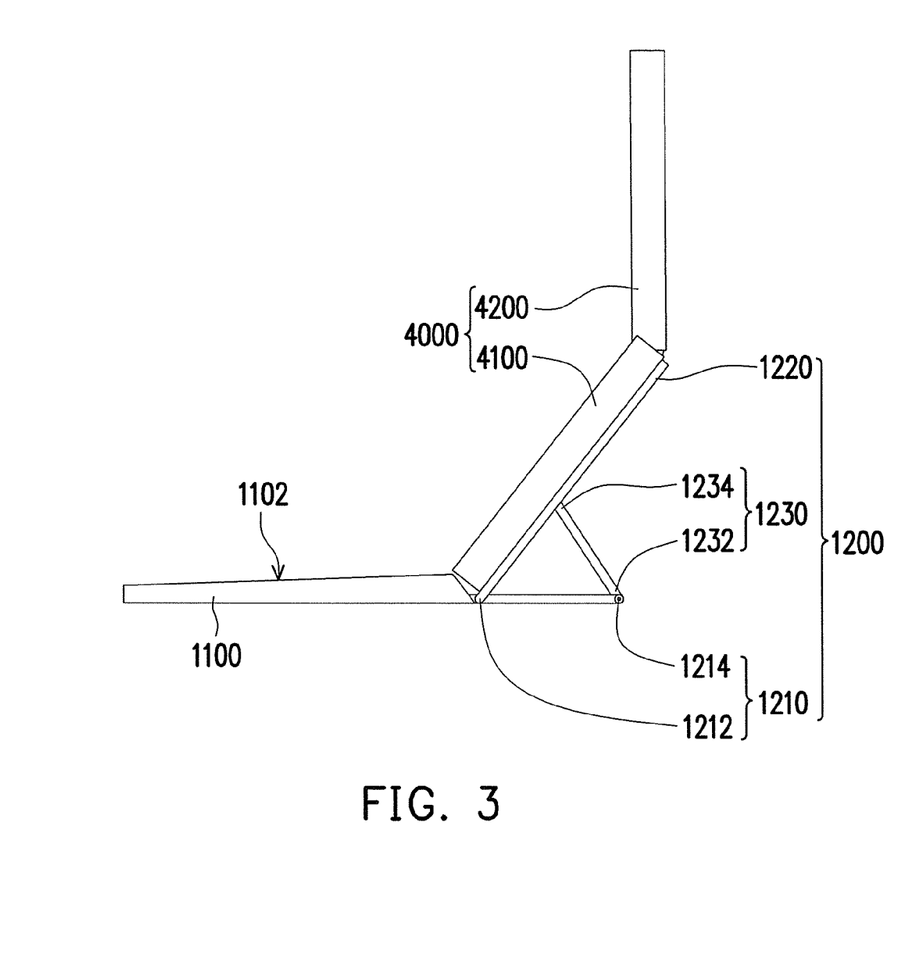
FIG. 3 is a side-view of the notebook computer stand in FIG. 1 when using.

FIG. 1 is a perspective view of a notebook computer stand in the first embodiment of the present invention, FIG. 2 is an another perspective view of the notebook computer stand in FIG. 1, and FIG. 3 is a side-view of the notebook computer stand in FIG. 1 when using. Referring to FIG. 1, FIG. 2 and FIG. 3, the notebook computer stand 1000 of the embodiment is used for supporting a notebook computer 4000. The notebook computer stand 1000 comprises a bottom case 1100 and a top panel 1200. The top panel 1200 has a first supporting element 1210, a top panel body 1220 and a second supporting element 1230. The first supporting element 1210 has a first side 1212 and a second side 1214. The first side 1212 pivots to the bottom case 1100, and the top panel body 1220 having multiple sets of first fixing structures 1222 pivots to the first side 1212 of the first supporting element 1210. The second supporting element 1230 has a third side 1232 and a fourth side 1234, wherein the third side 1232 pivots to the second side 1214 of the first supporting element 1210, and the fourth side 1234 has a set of second fixing structures 1234a inserted into one set of the first fixing structures 1222.

In detail, the above mentioned top panel body 1220 has an opening 1224 (shown in FIG. 4), and the first fixing structure 1222 is disposed at the side wall of the opening 1224. The first supporting element 1210 and the second supporting element 1230 of the embodiment have plate shapes, and at least portions of the first supporting element 1210 and the second supporting element 1230 are located in the opening 1224 when the notebook computer stand 1000 is in a using state or a containing state. The first fixing structures 1222 are concaves while the second fixing structures 1234a are protrusions, wherein the second fixing structures 1234a are inserted into different sets of the first fixing structures 1222, such that the notebook computer stand 1000 is in a containing state or in a using state for supporting the notebook computer 4000.

The second fixing structures 1234a are suitable for being inserted into one corresponding set of first fixing structures 1222, thus the different sets of the first fixing structures 1222 in different locations are denoted into different indicators for distinguishing. Referring to FIG. 1 and FIG. 2, for example, when the second fixing structures 1234a of the second supporting element 1230 of the notebook computer stand 1000 are inserted into the set of first fixing structures 1222a, the notebook computer stand 1000 is in the containing state. Meanwhile, the first supporting element 1210 and second supporting element 1230 having plate shapes are located in the opening 1224, and the first supporting element 1210, the second supporting element 1230 and the top panel body 1220 are together formed a complete surface, and the top panel 1200 is covering in the first surface 1102 of the bottom case 1100.

Figure 4:
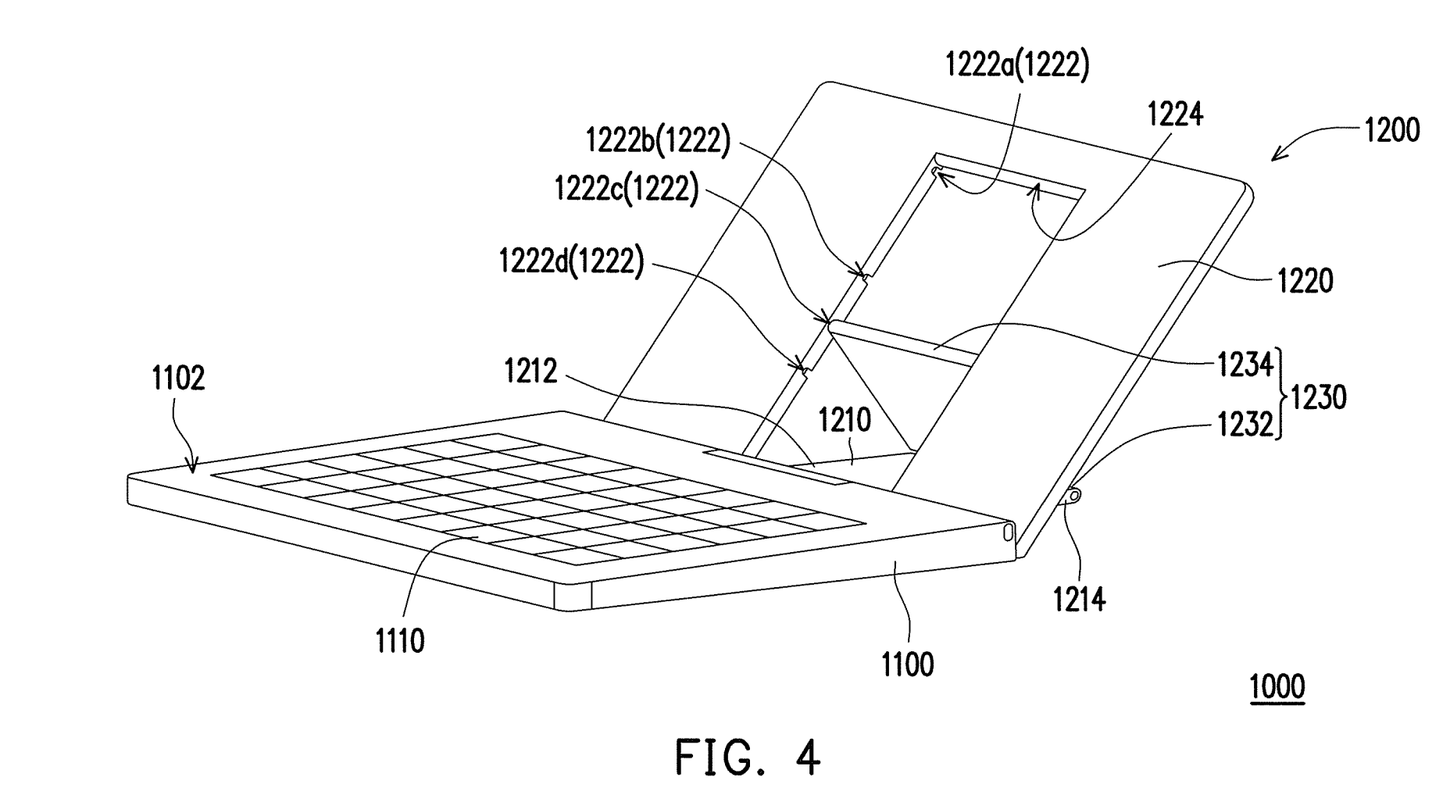
FIG. 4 is a perspective view of the notebook computer stand in FIG. 3.

FIG. 4 is a perspective view of the notebook computer stand in FIG. 3. Referring to FIG. 3 and FIG. 4, when the user uses the computer notebook stand 1000 of the embodiment, the user opens the top panel 1200 relative to the bottom case 1100, and adjusts an angle included between the top panel 1200 and the bottom case 1100. Then, pushing (or pulling) the second supporting element 1230 to disengage a restriction between the second fixing structures 1234a (shown in FIG. 1) and the first fixing structure 1222a. After, making the second fixing structures 1234a inserting into one set of the first fixing structures 1222 (such as the set of first fixing structures 1222c). The first side 1212 of the first supporting element 1210 pivots to the bottom case 1100, and the third side 1232 of the second supporting element 1230 pivots to the second side 1214 of the first supporting element 1210, therefore when the second fixing structures 1234a are inserted into the set of first fixing structure 1222c, the first supporting element 1210 and the second supporting element 1230 are driven to move. Meanwhile, the first supporting element 1210, the second supporting element 1230 and the top panel body 1220 faun a triangle, wherein the first side 1212 of the first supporting element 1210 and the fourth side 1234 of the second supporting element 1230 are located in the opening 1224. Then, the user assembles the notebook computer 4000 onto the top panel body 1220 of the top panel 1200 of the notebook computer stand 1000, and the notebook computer 4000 is supported and lifted higher than a tabletop by the triangle formed by the first supporting element 1210, the second supporting element 1230 and the top panel body 1220, such that a view angle of the notebook computer 4000 is also lifted, and the user uses the notebook computer 4000 in a comfortable gesture. Inserting the second fixing structures 1234a into the set of the first fixing structures 1222c mentioned above is only an illustration, the user can also inserts the second fixing structures 1234a into other sets of first fixing structures such as the set of first fixing structures 1222b or the set of first fixing structures 1222d, and an interval between two adjacent sets of first fixing structures 1222 and numbers of the sets of first fixing structures 1222 can be changed according to requirements.

It should be noted that when the user assembles the notebook computer 4000 onto the top panel body 1220 of the top panel 1200 of the notebook computer stand 1000, a bottom surface (not shown) of the host base 4100 of the notebook computer 4000 leans against the top panel body 1220, and the display screen (not shown) of the display 4200 of the notebook computer 4000 faces the user. Usually, a keyboard module (not shown) of the notebook computer 4000 is disposed on the host base 4100, thus when the notebook computer 4000 installed on the notebook computer stand 1000, the user can not operate the notebook computer 4000 easily due to the position of the keyboard module of the notebook computer 4000. Thus, a keyboard module 1110 is further installed at the first surface 1102 of the bottom case 1100 of the notebook computer stand 1000 that is facing the top panel 1200. Due to the disposition of the keyboard module 1110, the user adjusts the angle between the display screen and the host base 4100, and the keyboard module 1110 installed in the bottom case 1100 of the notebook computer stand 1000 is operated to key in, following the example of using a desktop computer, and then the user uses the notebook computer 4000 comfortably. In the present embodiment, the notebook computer 4000 is electrically connected to the keyboard module 1110 of the bottom case 1100 of the notebook computer stand 1000 by wire-connecting such as USB cables, or by wireless such as blue tooth or infrared rays.

With reference to FIG. 1, it should be mentioned that when the notebook computer stand 1000 is in the containing state, the top panel 1200 covers in the first surface 1102 of the bottom case 1100, and the second fixing structures 1234a of the fourth side 1234 of the second supporting element 1230 insert into the set of first fixing structures 1222a. Meanwhile, the top panel body 1220, the first supporting element 1210 and the second supporting element 1230 form a complete surface that is covering in the keyboard module 1110, and thus dust is prevented from falling into the keyboard module 1110.

It has to be mentioned that the way of connecting the above mentioned sets of the first fixing structures 1222 such as concaves and the second fixing structures 1234a such as protrusions with complementary shapes is only an illustration for explaining. In other embodiments, people skilled in the art may also change the connecting way according to actual requirements, such as linking up tightly, or using openings and hooks for restricting, the purpose for connecting the second fixing structures 1234a with one set of first fixing structure 1222 is also achieved.

Furthermore, though the first supporting element 1210 and the second supporting element 1230 of the embodiment have plate shapes, people skilled in the art can substitute the first supporting element 1210 and the second supporting element 1230 having plate shapes into shafts. It has to be mentioned that when the first supporting element 1210 and second supporting element 1230 are shafts, a surface of the top panel body 1220 close to the keyboard module 1110 has no opening 1224 but is a complete surface. The first supporting element 1210, the second supporting element 1230, the sets of first fixing structures 1222 and the second fixing structures 1234a aforementioned are all located at an another surface of the top panel body 1220 far away from the keyboard module 1110. Construction and operation are the same as the aforementioned description.

The Second Embodiment

The second embodiment is similar to the first embodiment. The same or similar component numbers denote the same or similar components, and differences between the first and the second embodiments are described below.

Figure 5A:
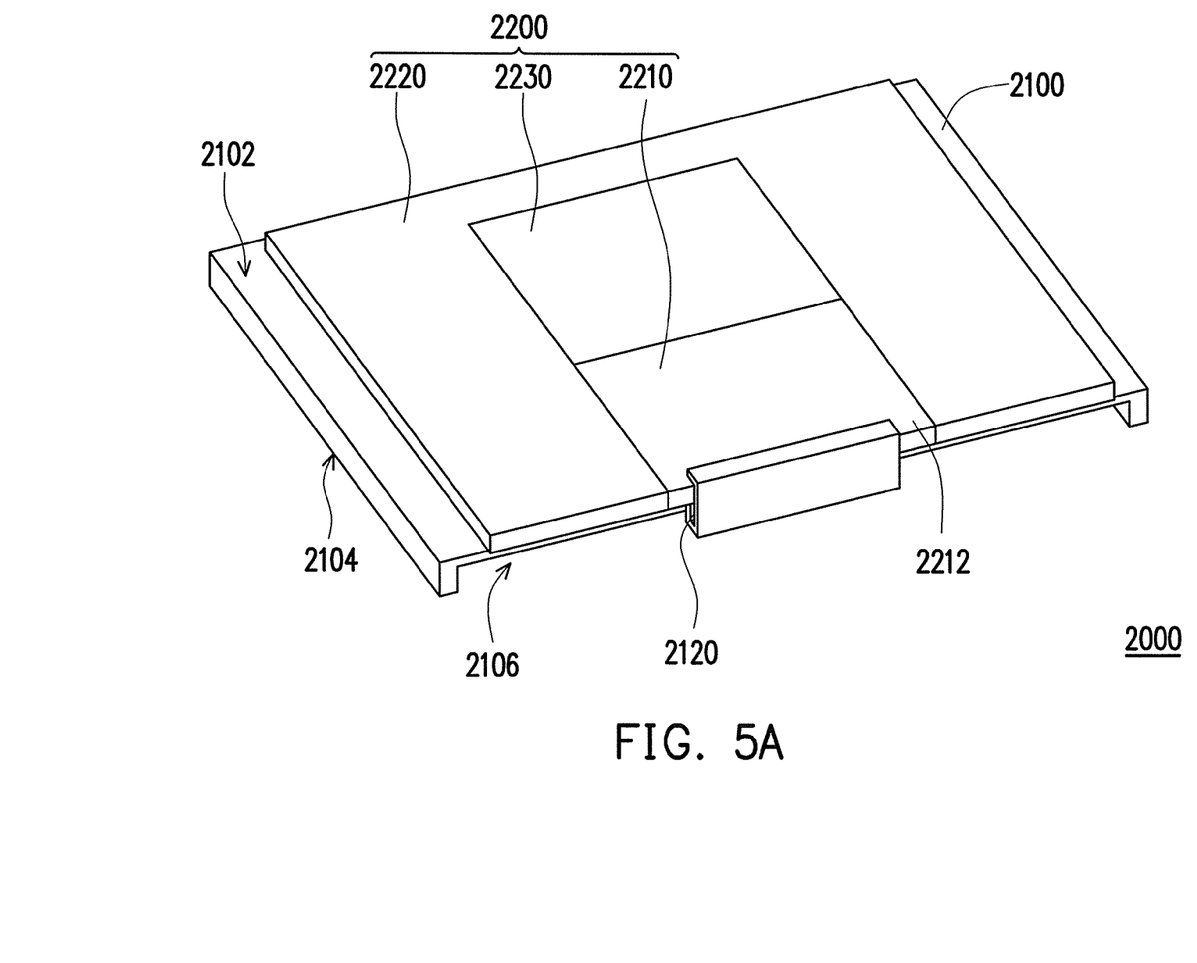
FIG. 5A and FIG. 5B illustrate the notebook computer stand in the second embodiment of the present invention in different containing states.
Figure 5B:
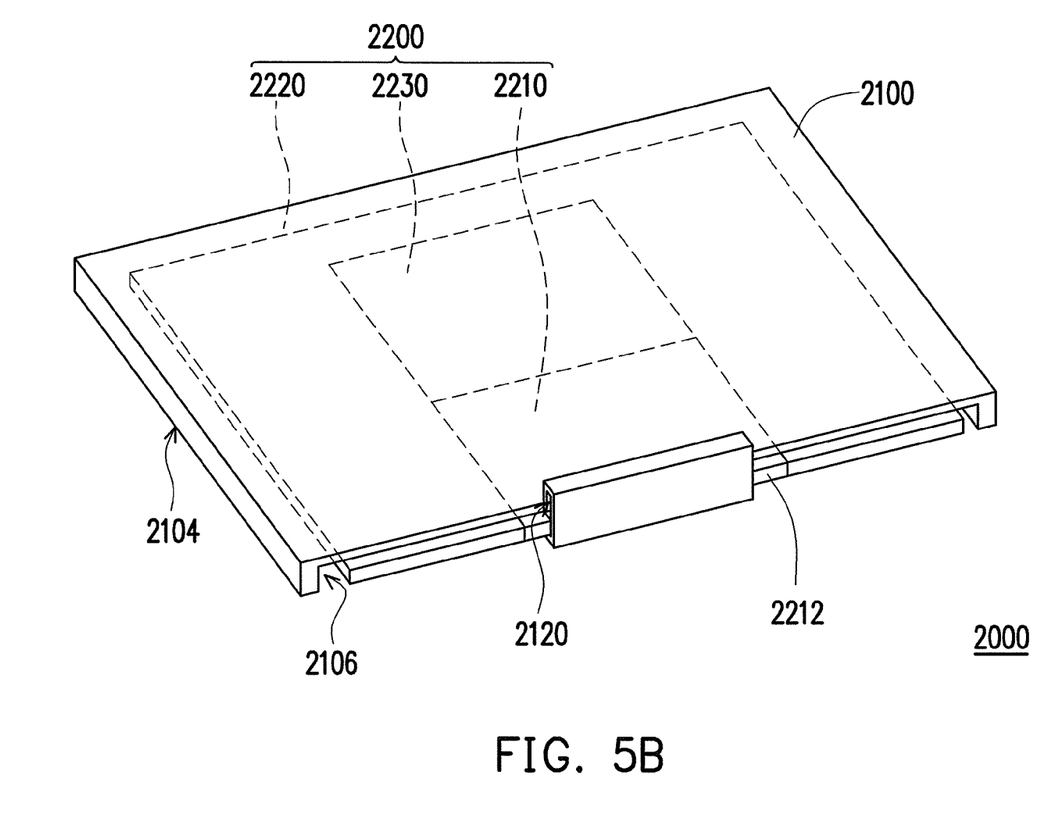
Figure 5C:
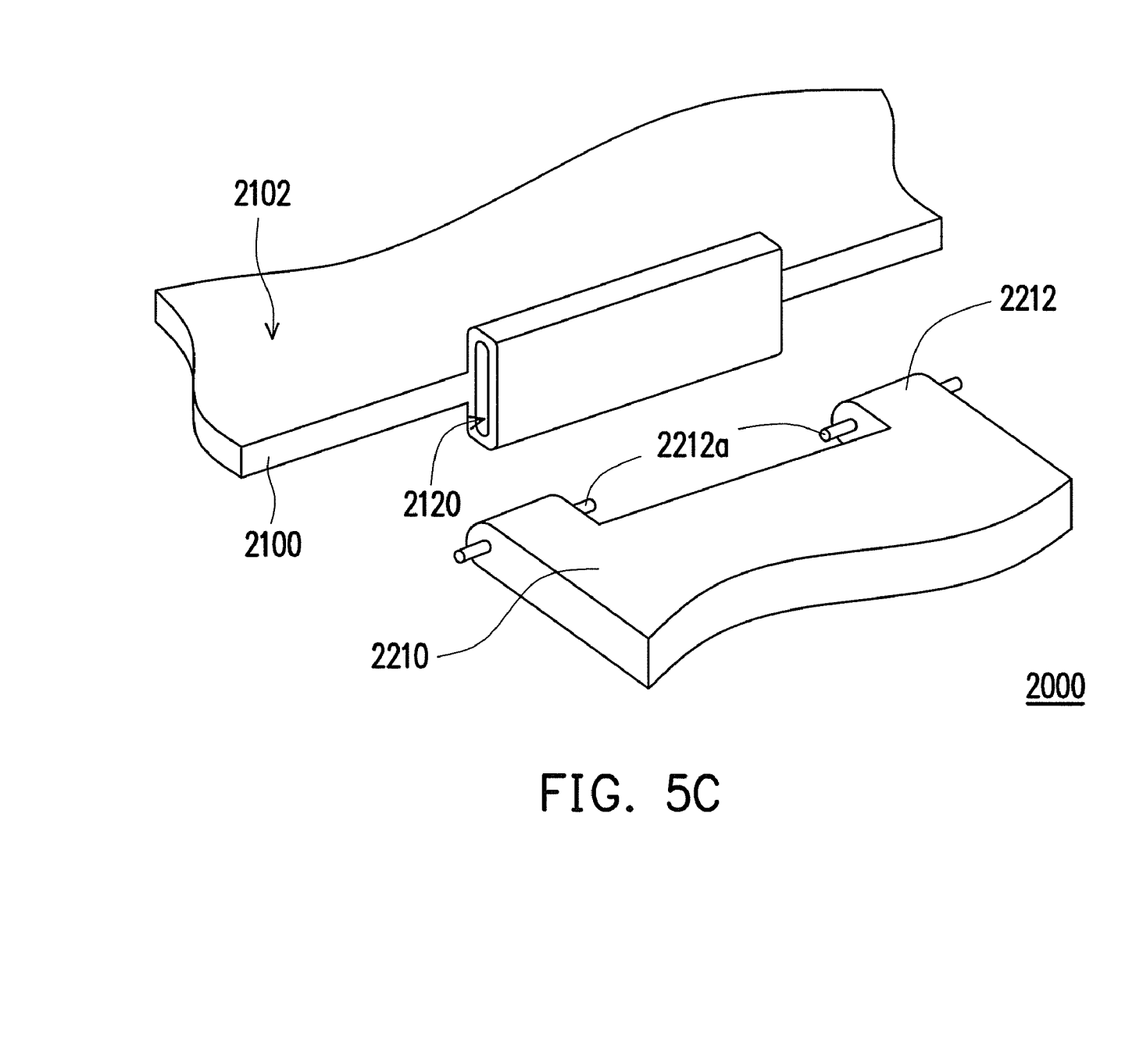
FIG. 5C illustrates parts of the notebook computer stand in FIG. 5A are disassembled.

FIG. 5A and FIG. 5B illustrate the notebook computer stand in the second embodiment of the present invention in different containing states, and FIG. 5C illustrates parts of the notebook computer stand in FIG. 5A are disassembled. For clarifying, the top panel body 2220 is not shown in FIG. 5C. Referring to FIG. 5A and FIG. 5C, in the notebook computer stand 2000 of the present embodiment, the bottom case 2100 has two sliding troughs 2120, the first side 2212 of the first supporting element 2210 has two ends 2212a, and the two ends 2212a are inserted into the sliding troughs 2120 correspondingly.

Figure 6A:
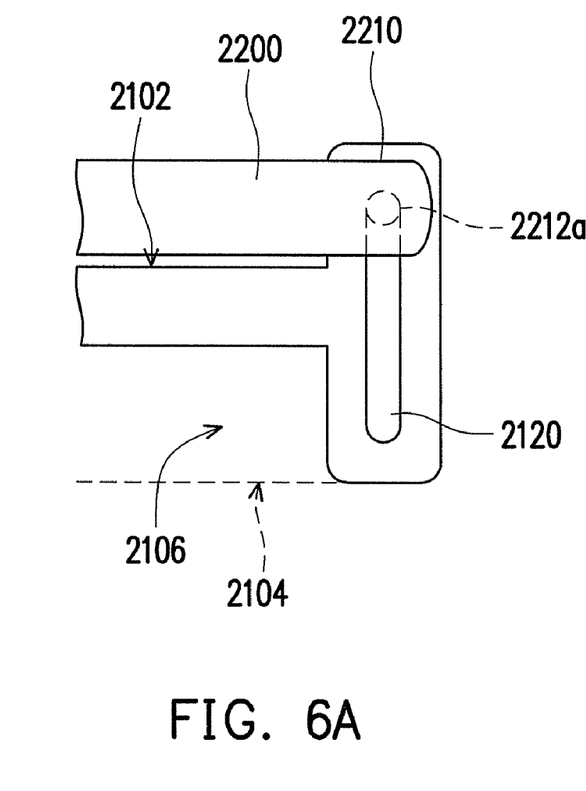
FIG. 6A and FIG. 6B are side-views of the notebook computer stand in FIG. 5A in different containing states.
Figure 6B:
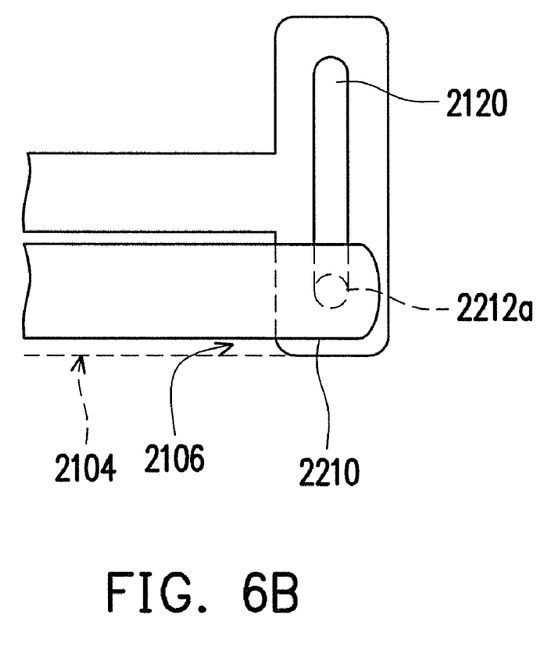

FIG. 6A and FIG. 6B are side-views of the notebook computer stand in FIG. 5A in different containing states. Referring to FIG. 5A and FIG. 6A, when the top panel 2200 is closed relative to a first surface 2102 of the bottom case 2100, the ends 2212a of the first side 2212 of the first supporting element 2210 are located in the upper location of the sliding troughs 2120. In addition, the first surface 2102 of the bottom case 2100 has a keyboard module 1110 (referring to FIG. 4), and a second surface 2104 opposite to the first surface 2102 has a concave 2106, which is used to accommodate the top panel 2200.

Referring to FIG. 5C, FIG. 5B and FIG. 6B, in detail, the user rotates the top panel 2200 relative to the ends 2212a of the first side 2212 as an axle and far away from the first surface 2102 of the bottom case 2100. Then, sliding the ends 2212a of the first side 2212 of the first supporting element 2210 along the sliding troughs 2120 to a lower location of the sliding troughs 2120, and rotating the top panel 2200 relative to the ends 2212a of the first side 2212 as an axle to close to the second surface 2104 of the bottom case 2100 and is accommodated in the concave 2106 of the bottom case 2100.

The Third Embodiment

The third embodiment is similar to the second embodiment. The same or similar component numbers denote the same or similar components, and differences between the second and the third embodiments are described below.

Figure 7A:
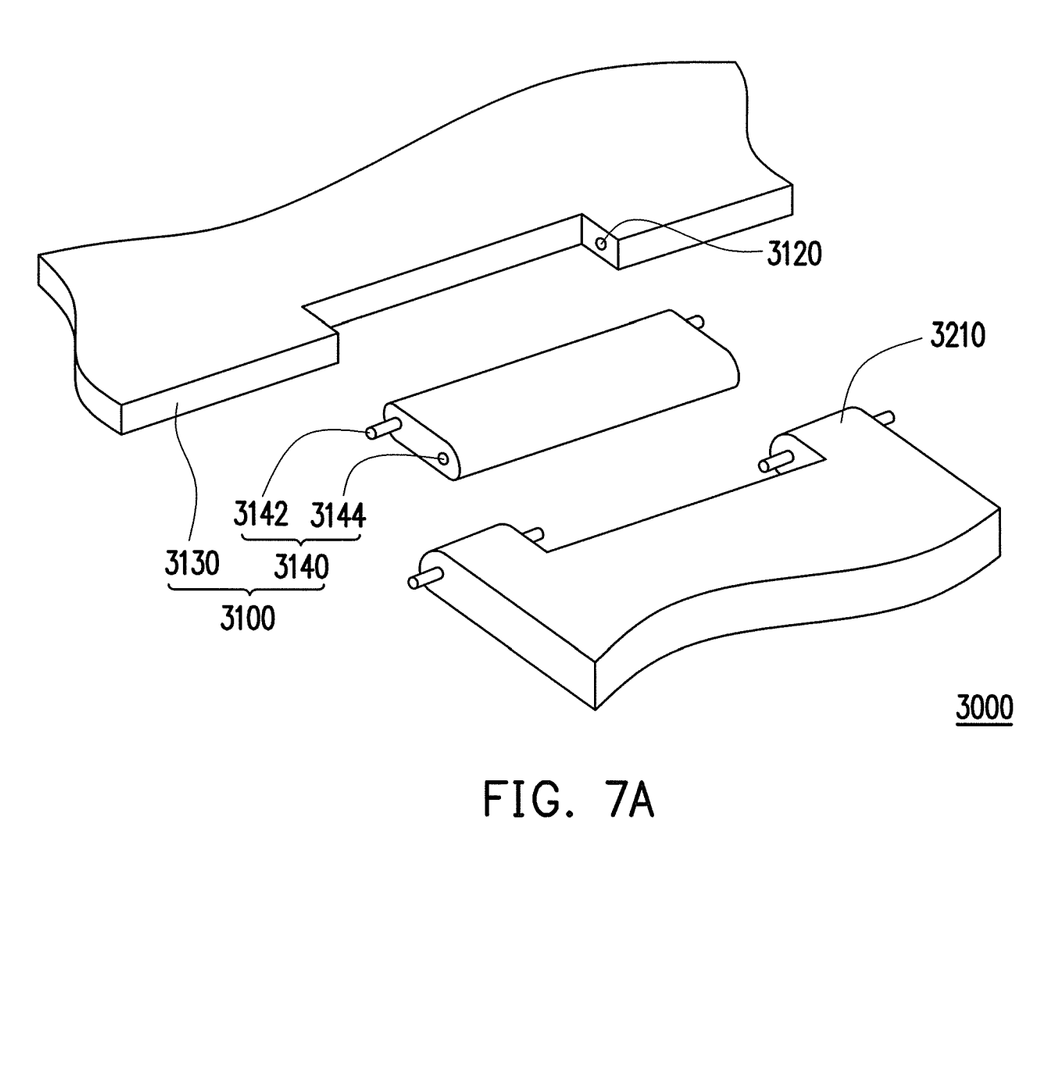
FIG. 7A illustrates the notebook computer stand in the third embodiment of the present invention that is disassembled.

FIG. 7A illustrates the notebook computer stand in the third embodiment of the present invention that is disassembled. Referring to FIG. 7A, in the notebook computer stand 3000 of the embodiment, the bottom case 3100 comprises a main body 3130 and a connecting element 3140, wherein the connecting element 3140 has a fifth side 3142 and a sixth side 3144. The fifth side 3142 pivots to the main body 3130, and the first supporting element 3210 pivots to the sixth side 3144.

Figure 7B:
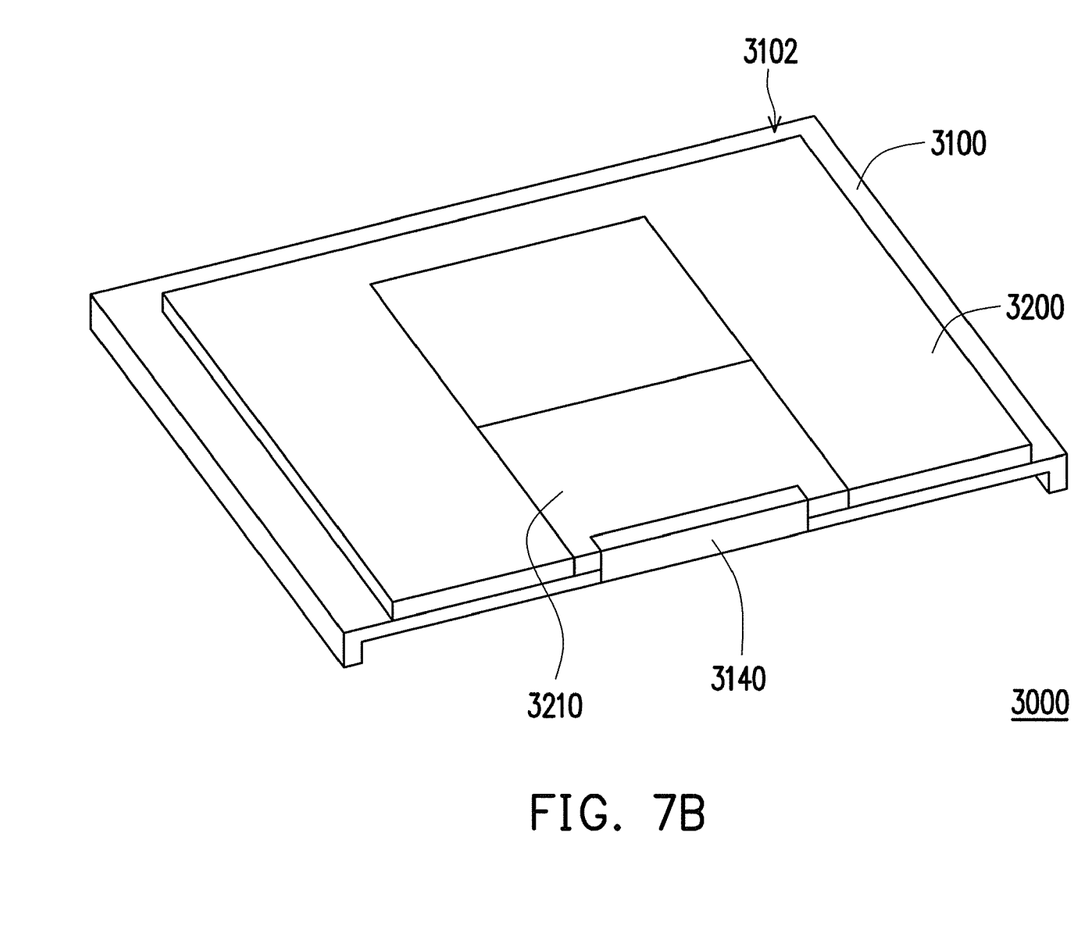
FIG. 7B illustrates the notebook computer stand in FIG. 7A in the containing state.
Figure 7C:
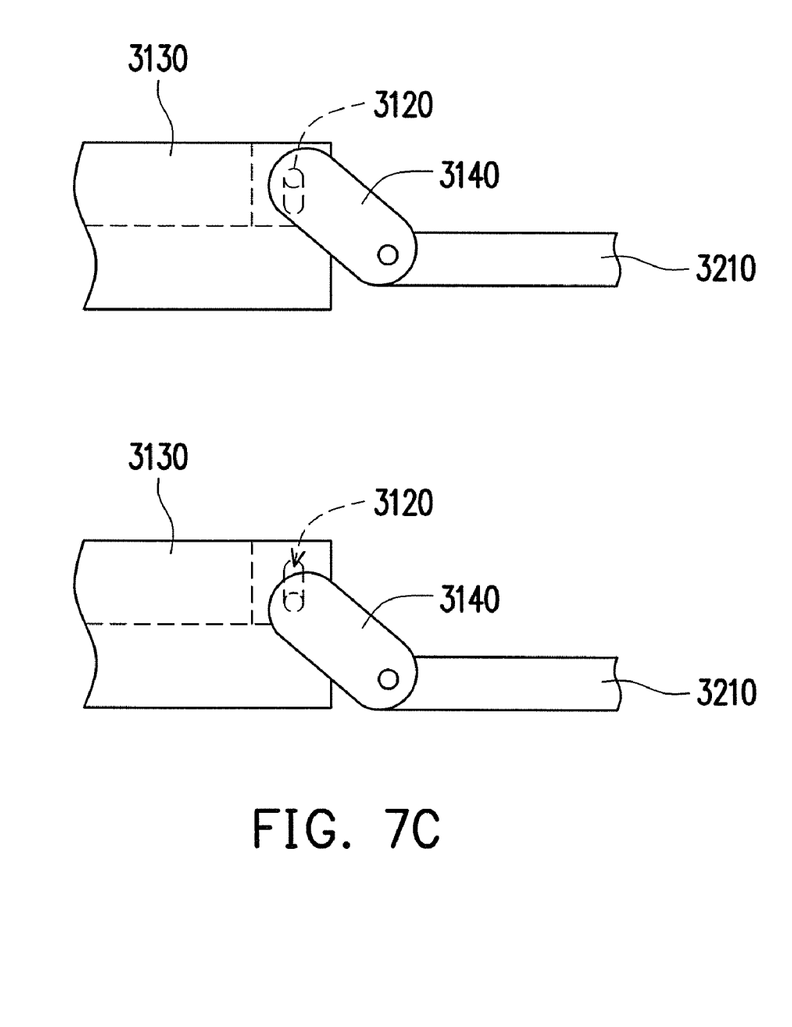
FIG. 7C illustrates the notebook computer stand in FIG. 7B in a using state.

FIG. 7B illustrates the notebook computer stand in FIG. 7A in the containing state. Referring to FIG. 7B, the top panel 3200 stays close to the first surface 3102 of the bottom case 3100 for containing. FIG. 7C illustrates the notebook computer stand in FIG. 7B in a using state. Referring to FIG. 7A and FIG. 7C, when the user is going to use the notebook computer stand 3000, the user rotates the top panel 3200 first, and then the first supporting element 3210 rotates about the connecting element 3140 as an axle and relative to the main body 3130. Therefore the top panel 3200 rotates upwards relative to the main body 3130, and then protrusions of the fifth side 3142 of the connecting element 3140 slide downwards in the sliding troughs 3120, thus the first supporting element 3210 stays close to the tabletop as shown in FIG. 3a, and the notebook computer stand 3000 is in a using state.

Figure 7D:
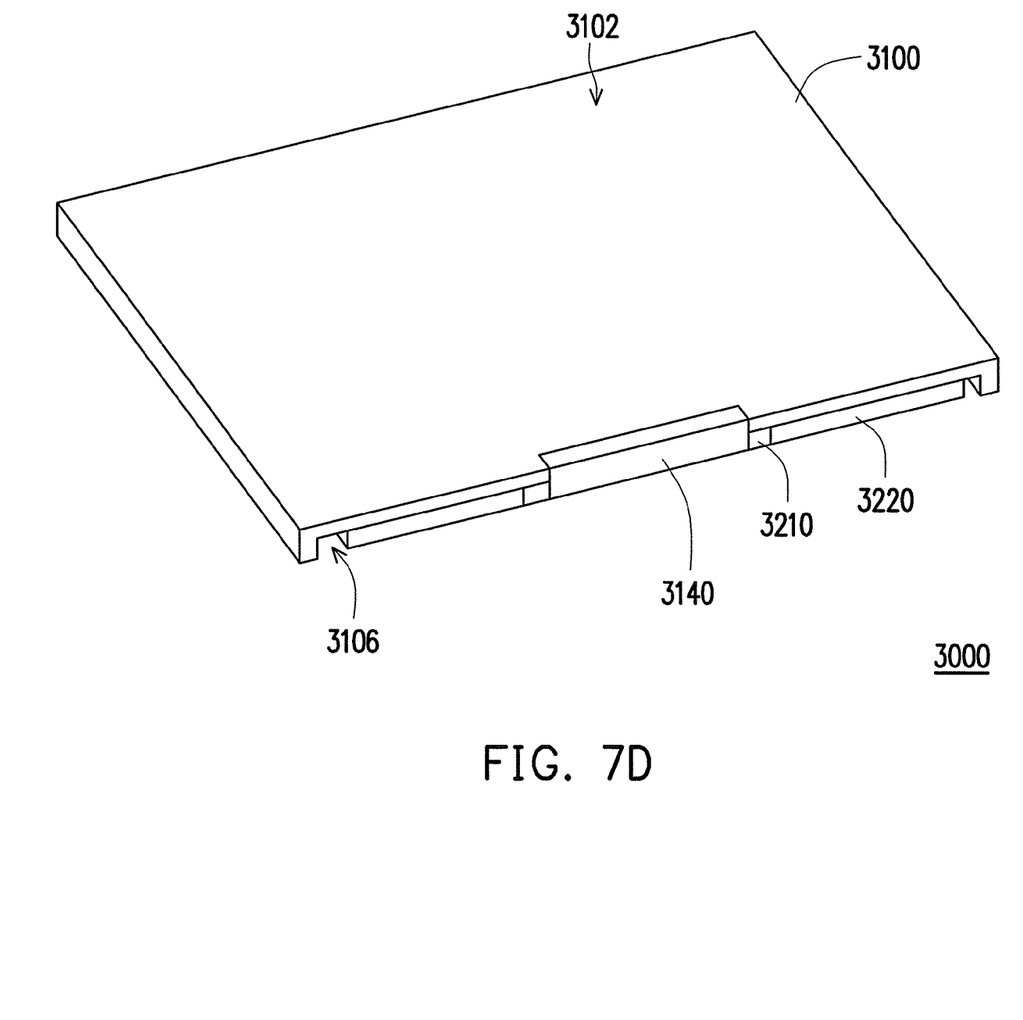
FIG. 7D illustrates another containing state of the notebook computer stand in FIG. 7B.

Referring to FIG. 7C and FIG. 7D, the user rotates the top panel 3200, and the first supporting element 3210 rotates about the connecting element 3140 as an axle and relative to the main body 3130. Therefore the top panel 3200 rotates downwards relative to the main body 3130, and then the protrusions of the fifth side 3142 of the connecting element 3140 slide upwards in the sliding troughs 3120, thus the top panel 3200 is accommodated in the concave 3106 of the bottom case 3100, as shown in FIG. 7D.

To sum up, with the notebook computer being assembled onto the notebook computer stand of the present invention, the user can operate the notebook computer in a much more comfortable gesture for long period. In addition, when the top panel is covering in the bottom case having the keyboard module, the dust is prevented form falling into the keyboard module, and thus a dust sheet is no more needed in the present invention.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A notebook computer stand, comprising:
   a bottom case;
   a top panel, comprising:
      a first supporting element, having a first side and a second side, and the first side being pivoted at the bottom case, wherein the bottom case has two sliding troughs, the first side has two ends, and the two ends are correspondingly inserted into the sliding troughs and slide within the sliding troughs;
      a top panel body, pivoted at the first side of the first supporting element with the two ends as an axle, and the top panel body having a plurality of sets of first fixing structure; and
      a second supporting element, having a third side and a fourth side, the third side being pivoted to the second side of the first supporting element, the fourth side having a set of second fixing structures, and the set of second fixing structures is inserted into one set of the first fixing structures.

2. The notebook computer stand as claimed in claim 1, wherein the bottom case close to a first surface of the top panel relatively has a keyboard module, and a second surface opposite to the first surface has a concave.

* * * * *